United States Patent [19]

Adasek et al.

[11] Patent Number: 5,186,237
[45] Date of Patent: Feb. 16, 1993

[54] MULTI-ZONE HVAC SYSTEM WITH AN AIR BYPASS FOR INDIVIDUAL FLOW CONTROL

[75] Inventors: Kenneth P. Adasek, Warren; James C. Ostrand, Armada, both of Mich.

[73] Assignee: General Motors Corporation, Detroit, Mich.

[21] Appl. No.: 894,973

[22] Filed: Jun. 8, 1992

[51] Int. Cl.⁵ .............................................. F25B 29/00
[52] U.S. Cl. ...................................... 165/42; 165/43; 165/101; 165/108; 165/22; 236/13; 237/12.3 A; 454/139; 454/143; 454/156; 454/159; 454/160
[58] Field of Search ............... 165/22, 42, 43, 108, 165/16, 101; 236/13; 237/12.3 A; 454/139, 143, 156, 159, 160

[56] References Cited

U.S. PATENT DOCUMENTS

| | | | |
|---|---|---|---|
| 3,393,625 | 7/1968 | Takach | 454/159 |
| 3,472,146 | 10/1969 | Mazurkiewicz | 454/159 |
| 3,750,556 | 8/1973 | Duke et al. | 454/159 |
| 4,408,714 | 10/1983 | Kobayashi | 236/13 |
| 4,467,706 | 8/1984 | Batcheller et al. | 454/70 |
| 4,534,507 | 8/1985 | Matsuda | 237/12.3 A |
| 4,549,692 | 10/1985 | Busch et al. | 237/12.3 A |
| 4,560,103 | 12/1985 | Schulz et al. | 236/13 |
| 4,584,846 | 4/1986 | Uchida | 62/244 |
| 4,685,508 | 8/1987 | Iida | 165/43 |
| 4,759,269 | 7/1988 | Brown et al. | 165/42 |
| 4,802,405 | 2/1989 | Ichitani et al. | 98/2.06 |
| 4,819,715 | 4/1989 | Kobayashi | 165/43 |
| 4,852,639 | 8/1989 | Horiguchi et al. | 165/42 |
| 4,858,676 | 8/1989 | Bolfik et al. | 165/43 |
| 4,901,788 | 2/1990 | Doi | 165/24 |
| 5,086,830 | 2/1992 | Heinle et al. | 165/43 |

Primary Examiner—John K. Ford
Attorney, Agent, or Firm—Patrick M. Griffin

[57] ABSTRACT

An automotive heater and air conditioning system has multiple zones each supplied by a separate air flow passage serviced by a common blower and common heat exchangers. One of the passages has an adjustable air flow mechanism which bypasses some air from the passage without disturbing the air flow in other passages. A bypass port in the one passage at a point near the blower outlet is controlled by an adjustable door which is pivotally mounted in the passage at the downstream edge of the port. An induction housing receives air from the bypass port and returned it to the intake if the blower.

8 Claims, 1 Drawing Sheet

MULTI-ZONE HVAC SYSTEM WITH AN AIR BYPASS FOR INDIVIDUAL FLOW CONTROL

FIELD OF THE INVENTION

This invention relates to automotive heating and air conditioning systems with separate flow passages serving different zones in the vehicle compartment and an apparatus for adjusting the air flow in one passage independently of the others.

BACKGROUND OF THE INVENTION

Heating, ventilating and air conditioning (HVAC) systems for automotive vehicles sometimes employ multi-zone ducting and controls to permit individual comfort control. For example, the driver side and the passenger side of the front of the compartment comprise separate zones and separate temperature controls so that, within limits, the temperature of one side can be different from the other side according to occupant preferences. Other multi-zone systems comprise separate ducts for driver side and passenger side in the front and either one or two zones for rear seat passengers.

Heretofore the multi-zone systems have allowed adjustment of temperature in each zone. However, optimum comfort depends not only on temperature but also on the volume of air flow discharged from the vent of a duct. While it has been known in a multiple passage network to include a throttle valve in one passage for adjusting the air flow through it, the adjustment is typically made at the expense of the air flow in neighboring passages; that is, the total flow is apportioned among the several passages and when the flow is decreased in one passage it is increased in the neighboring passage or vice versa. If applied to a multi-zone system, that arrangement would result in enabling one zone to be adjusted while upsetting the flow in other zones.

SUMMARY OF THE INVENTION

It is therefore an object of the invention to provide a multi-zone HVAC system having the capability of varying the air flow in at least one zone without disturbing the air flow in other zones.

The invention is carried out by an automotive temperature control system for supplying air to different zones of a vehicle compartment comprising: a blower having an intake and an outlet; a plurality of air passages each having a discharge vent in a vehicle compartment and extending from the blower outlet to its respective discharge vent; heat exchange means in the passages for affecting the temperature of air passing to each discharge vent; and bypass means in at least one passage for controlling the volume of air in that one passage independently of the air flow in the other passages comprising a bypass opening adjacent the blower outlet, means for connecting the bypass opening to the blower intake to thereby draw air from the one passage to the intake, and valve means for controllably adjusting the air flow through the opening.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

The embodiment of the invention described herein is for a tri-zone HVAC system which separately supplies the driver side, the front passenger side and the rear passenger zones. It will be apparent, however, that it applies as well to other multi-zone systems including dual-zone and quad-zone systems. Further the invention, as described, provides an adjustable bypass in one flow passage for controlling the air flow in one zone. The concept may, however, be extended to providing such a bypass in more than one of the passages.

Figure 1:
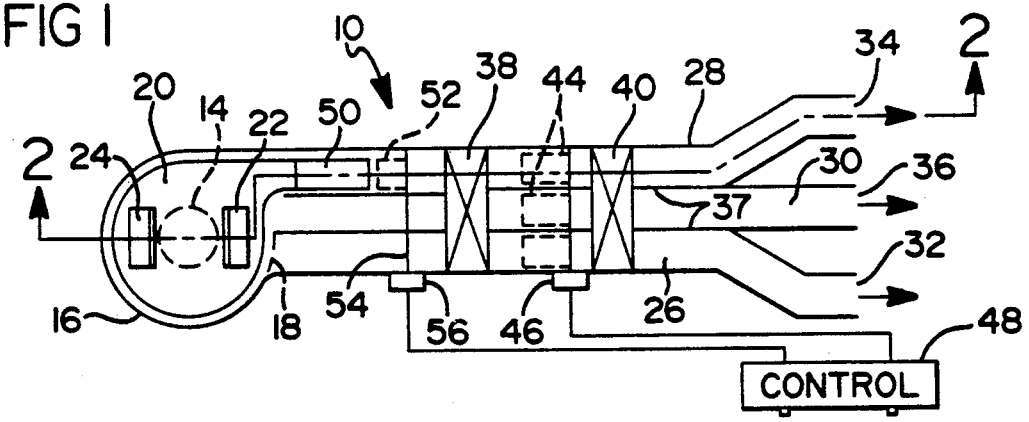
FIG. 1 is a top schematic view of a multizone system incorporating a bypass arrangement according to the invention.
Figure 2:
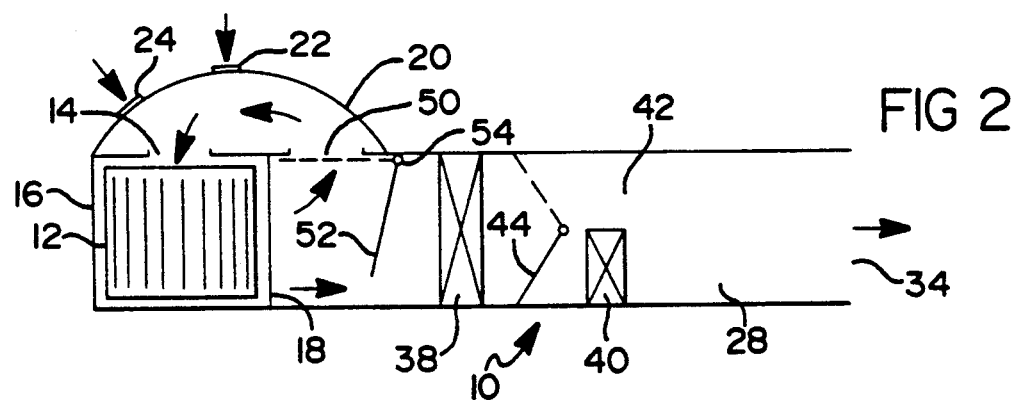
FIG. 2 is a cross section along line 2—2 of FIG. 1 showing the bypass arrangement.

Referring to FIGS. 1 and 2, a heating and air conditioning system 10 comprises a blower 12 having a central intake 14. The blower 12 includes a blower housing 16 having an outlet 18 and covered on the top by an induction housing 20. The induction housing 20 has upper inlet ports 22 and 24 for admitting fresh air and recirculation air, respectively. Three ducts or passages 26, 28 and 30 are coupled side-by-side to the blower outlet 18 and extend to respective discharge vents 32, 34 and 36 at the driver side zone, the front passenger side zone and the rear passenger zone respectively. The ducts have share common walls 37 at least throughout part of their length. Heat exchangers comprising an evaporator 38 and a heater core 40 each extend across all three passages for respectively cooling and heating the air flowing through the passages. A bypass 42 around the heater core 40 in each passage controlled by temperature doors 44 allows selective modification of air temperature. FIG. 1 shows a single motor 46 for actuating all the doors 44 in unison, however, a separate motor may be provided for each door 44 for independent actuation. In any event the motor 46 is electrically connected to a control head 48 where desired conditions are manually entered by the vehicle occupants. Although not specifically shown in the drawings, each passage may have branches to afford multiple outlets, as in known in the art, to most effectively distribute the air flow in each zone.

Usually the air flow volume is such systems is determined solely by blower speed. In the present system it is possible to further adjust the air flow volume in one of the passages by means of a bypass and without disturbing the flow in the other passages. The passage 28 for the passenger side zone contains an adjustable bypass upstream of the heat exchangers comprising an opening or port 50 in the passage 28 adjacent the blower outlet 18 to exhaust air flow from the duct. The port is covered by the induction housing which has an inlet aligned with the port 50 so that the exhausted air flow is directed back to the blower intake 14. A control valve or door 52 is pivotally mounted on a rotatable shaft 54 adjacent the port 50 at the downstream side of the port for movement between an open position shown in solid lines in FIG. 2 and a closed position shown in dotted lines. A motor 56 mounted outside the ducts and operatively attached to the shaft 54 actuates the door 52 to open, closed or any intermediate position. The motor is electrically connected to the control head 48 for selection of the desired door 52 position.

The door 52, when in open position partially obstructs the passage 28, allowing only about 15% of full air flow to the discharge vent 34, and the remainder is bypassed through the port 50 to the blower intake. When in closed position the door 52 completely closes the port 50 so that all the air flow into the passage 28 continues to the discharge vent 34. For intermediate door positions, the air flow is apportioned between the bypass and the discharge vent according to the door position. The port 50 is sized so that for door open position the air flow exiting the fan and moving toward the passage 28 is substantially the same as when the door is closed. Similarly, when the door is in an intermediate position the total air flow exiting the fan and moving toward the passage will be the same. Because the airflow exiting the fan and moving toward the passage 28 is substantially constant (for a given blower speed), for all door 52 positions, the door operation has no effect on the air flow in the other passages 26 and 30.

Figure 3:
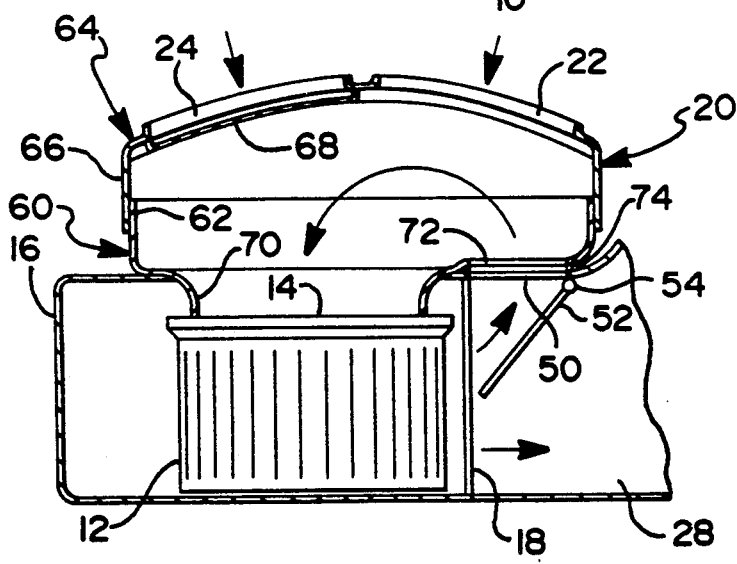
FIG. 3 is a cross-sectional elevation of a bypass arrangement according to the invention.
Figure 4:
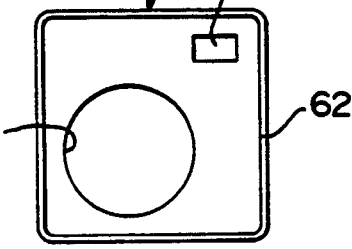
FIG. 4 is a plan view of the bottom of the induction housing of FIG. 3.

FIG. 3 shows a structural cross section of the blower end of the system which, like FIG. 2, is sectioned along a line which passes through the blower 12 as well as the bypass port 50. The assembly shown includes the blower 12, its housing 16, the induction housing 20, the passage 28, the bypass port 50, and the door 52. The induction housing 20 includes a bottom portion 60 having upturned walls 62 and a top portion 64 having walls 66 which overlap the walls 62 of the bottom portion 60. The inlet ports 22 and 24 in the top portion 64 are selectively covered by a sliding door 68 thereby controlling the admission of fresh air or recirculating air. The bottom portion 60, also shown in FIG. 4, is generally rectangular and has a downwardly flared opening 70 registered with the blower intake 14 for admitting air from the induction housing to the blower. The side of the bottom portion nearest the passages 26-30 overlaps the passages and a bypass port 72 in one corner of the bottom portion 60 registers with the bypass port 50 in the passage 28. A gasket 74 surrounding the port 50 outside the passage 28 seals the ports 50 and 72.

It will thus be seen that a new dimension of personalized comfort control is provided by the system described herein; specifically the adjustable bypass control affords to a passenger the ability to modify the air flow volume into the passenger zone without detracting from the comfort and control of occupants seated in other zones. This air volume control can, if desired, be used in conjunction with individual zone temperature control.

The embodiments of the invention in which an exclusive property or privilege is claimed are defined as follows:

1. An automotive temperature control system for supplying air to different zones of a vehicle compartment comprising:
   a blower having an intake and an outlet;
   a plurality of air passages each separately communicating air from said blower outlet to a discharge vent in a different zone of a vehicle compartment;
   heat exchange means in the passages for affecting the temperature of air passing to each discharge vent; and
   bypass means in at least one passage for controlling the volume of air flow in that one passage across a range of air flows across a range of air flows while having the air flow in the other passages substantially unaffected comprising a bypass opening adjacent the blower outlet, means for connecting the bypass opening to the blower intake to thereby draw air from the one passage to the intake, and valve means for controllably adjusting the air flow through the opening.

2. The invention as defined in claim 1 wherein the valve means comprises a valve in the one passage movable between a first position which closes the bypass opening and fully opens the one passage and a second position which opens the bypass opening and restricts air flow in the one passage, said first and second positions being the limits of said range.

3. The invention as defined in claim 2 further including operator manipulated control means coupled to the valve to selectively position the valve at any position between the first and second positions to thereby regulate air flow in the one passage.

4. The invention as defined in claim 1 wherein the valve means comprises a door pivotally mounted in the one passage near the bypass opening for variably controlling the relative amounts of air flow through the bypass opening and through the one passage.

5. The invention as defined in claim 4 wherein the door is controlled by an electric motor, and further includes a control electrically connected to the motor for positioning the door.

6. The invention as defined in claim 1 wherein the means for connecting the bypass opening to the blower intake comprises a housing covering both the bypass opening and the blower intake.

7. The invention as defined in claim 1 wherein the means for connecting the bypass opening to the blower intake comprises an induction housing having ports for fresh air and recirculating air, the induction housing covering both the bypass opening and the blower intake.

8. An automotive temperature control system for supplying heated and/or cooled air to different zones of a vehicle compartment comprising:
   a blower having an intake and an outlet; an induction housing covering the blower intake and including port means for selectively admitting fresh air and recirculating air to the blower intake;
   a plurality of air passages separately communicating air from said blower outlet to respective discharge vents in different zones of said vehicle compartment, each passage extending between its respective discharge vent and the blower outlet;
   heat exchange means in the passages for affecting the temperature of air passing to each discharge vent; and
   means in at least one passage for controlling the volume of air flow in that one passage across a range of air flows while leaving the air flow in the other passages substantially unaffected comprising a bypass adjacent the blower outlet and connected to the induction housing for air flow from the one passage through the bypass to the intake, and valve means operatively associated with the bypass for controllably adjusting the air flow through the bypass.

* * * * *